United States Patent
Singh

(10) Patent No.: US 11,350,357 B2
(45) Date of Patent: May 31, 2022

(54) FACILITATING USE OF MULTI-OPERATOR, MULTI-BAND AND UNLICENSED SPECTRUM FOR A USER EQUIPMENT USING OUT OF BAND CONTROL CHANNELS

(71) Applicant: Telcom Ventures, LLC, Miami, FL (US)

(72) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 0 days.

(21) Appl. No.: 17/424,419

(22) PCT Filed: Mar. 16, 2020

(86) PCT No.: PCT/US2020/022966
§ 371 (c)(1),
(2) Date: Jul. 20, 2021

(87) PCT Pub. No.: WO2020/190864
PCT Pub. Date: Sep. 24, 2020

(65) Prior Publication Data
US 2022/0095214 A1 Mar. 24, 2022

Related U.S. Application Data

(60) Provisional application No. 62/819,931, filed on Mar. 18, 2019.

(51) Int. Cl.
*H04W 48/18* (2009.01)
*H04W 36/14* (2009.01)
(Continued)

(52) U.S. Cl.
CPC ............. *H04W 48/18* (2013.01); *H04W 4/24* (2013.01); *H04W 36/14* (2013.01); *H04W 36/30* (2013.01); *H04W 36/32* (2013.01); *H04W 88/06* (2013.01)

(58) Field of Classification Search
CPC ....... H04W 48/18; H04W 4/24; H04W 36/14; H04W 36/30; H04W 36/32; H04W 88/06
See application file for complete search history.

(56) References Cited

U.S. PATENT DOCUMENTS

2006/0221917 A1   10/2006   McRae
2010/0093340 A1   4/2010    Buracchini
(Continued)

OTHER PUBLICATIONS

"International Search Report and Written Opinion of the International Searching Authority", International Application No. PCT/US2020/022966, dated Jun. 11, 2020.
(Continued)

*Primary Examiner* — Magdi Elhag
(74) *Attorney, Agent, or Firm* — Myers Bigel, P.A.

(57) ABSTRACT

Methods and devices for selecting a communication network by a node of an Out of Band Control Channel Network (OBCCN) for use by a User Equipment (UE) are described. One or more communication networks that are available to provide service to the UE may be determined. The node of the OBCCN may select the communication network out of the communication networks that are available. The node of the OBCCN may provide control information to the UE for connecting to the communication network that was selected. The OBCCN may be operated independently from one or more Mobile Network Operators (MNOs) associated with the one or more communication networks.

21 Claims, 8 Drawing Sheets

(51) Int. Cl.
*H04W 36/32* (2009.01)
*H04W 4/24* (2018.01)
*H04W 36/30* (2009.01)
*H04W 88/06* (2009.01)

(56) References Cited

U.S. PATENT DOCUMENTS

| | | | |
|---|---|---|---|
| 2011/0151924 A1* | 6/2011 | Miller | H04L 67/12 |
| | | | 455/552.1 |
| 2012/0188876 A1* | 7/2012 | Chow | H04W 48/18 |
| | | | 370/252 |
| 2013/0322329 A1 | 12/2013 | Visuri et al. | |
| 2014/0274035 A1* | 9/2014 | Unger | H04W 76/18 |
| | | | 455/432.1 |
| 2015/0215832 A1* | 7/2015 | Fitzpatrick | H04W 36/00837 |
| | | | 455/426.1 |
| 2016/0242111 A1* | 8/2016 | Wakabayashi | H04W 4/70 |
| 2020/0045519 A1* | 2/2020 | Raleigh | G06Q 30/02 |

OTHER PUBLICATIONS

Inoue, Masugi, et al., "MIRAI: A Solution to Seamless Access in Heterogeneous Wireless Networks", IEEE International Conference on Communications, 2003. ICC 03, Anchorage, AK, USA, May 2003, pp. 1033-1037.

* cited by examiner

FACILITATING USE OF MULTI-OPERATOR, MULTI-BAND AND UNLICENSED SPECTRUM FOR A USER EQUIPMENT USING OUT OF BAND CONTROL CHANNELS

CROSS-REFERENCE TO RELATED APPLICATIONS

The present application is a 35 U.S.C. § 371 national stage application of PCT International Application No. PCT/US2020/022966, filed on Mar. 16, 2020, which itself claims the benefit of U.S. Provisional Patent Application Ser. No. 62/819,931, filed Mar. 18, 2019, the disclosures of both of which are herein incorporated in their entireties by reference.

FIELD

Various embodiments described herein relate to methods, devices, and computer program products for communication networks, and more particularly to wireless communication networks that use out of band control channels.

BACKGROUND

Opportunistic use of spectrum using licensed and unlicensed spectrum is a common practice. However, in current practice, the User Equipment (UE) may be controlled by the Mobile Network Operator (MNO), i.e. service providers. The UE may be handed over to another spectrum such as unlicensed spectrum but may still be under the control of the MNO where the UE is a subscriber. If there is an out of band control channel that provides control operations, the UE may be under the control of the network which operates the out of band control channel, typically the MNO.

SUMMARY

Various embodiments of the present invention are directed to a method for selecting a communication network by a node of an Out of Band Control Channel Network (OBCCN) for use by a User Equipment (UE). The method includes determining one or more communication networks that are available to provide service to the UE, selecting, by the node of the OBCCN, the communication network out of the one or more communication networks that are available, and providing, by the node of the OBCCN, control information to the UE for connecting to the communication network that was selected. The OBCCN is operated independently from one or more Mobile Network Operators (MNOs) associated with the one or more communication networks.

According to some embodiments, selecting the communication network may include selecting the communication network based on signal quality of the communication network, and/or cost of usage of the communication network. In some embodiments, selecting the communication network may include selecting the communication network based on respective traffic capacities of the one or more communication networks. Selecting the communication network may be based on a profile associated with the UE. The profile includes pricing preferences and/or traffic preferences of a user of the UE. In some embodiments selecting the communication network may include requesting, by the node of the OBCCN, pricing information from the one or more MNOs associated with the one or more communication networks, and selecting, by the node of the OBCCN, the communication network out of the one or more communication networks based on the pricing information provided by the one or more MNOs. The pricing information may be requested by periodically polling the one or more MNOs to obtain updated pricing information for selection of the communication network for use by the UE.

According to some embodiments, the method may include determining, by the node of the OBCCN, respective traffic capacities related to the one or more communication networks associated with the one or more MNOs. The communication network may be selected based on the respective traffic capacities related to the one or more communication networks. The method may include providing an offline map to the UE for use when the OBCCN is not in communication with the UE. The offline map includes respective geographic locations of the UE associated with corresponding ones of the one or more communication networks. The offline map includes associations with the one or more communication networks that were previously used when the UE was in corresponding ones of the geographic locations. A communication channel of the OBCCN between the node and the UE may be a secure communication channel.

Various embodiments of the present invention are directed to a method for communicating over a communication network by a User Equipment (UE). The method includes connecting to a node of an Out of Band Control Channel Network (OBCCN), receiving, from the node of the OBCCN, status information associated with one or more communication networks, and selecting the communication network out of the one or more communication networks based on the status information received from the node of the OBCCN. The OBCCN may be operated independently from one or more Mobile Network Operators (MNOs) associated with the one or more communication networks.

According to some embodiments selecting the communication network may include selecting, by the UE, the communication network based on signal quality of the communication network and/or cost of usage of the communication network. In some embodiments, selecting the communication network out of the one or more communication networks may include selecting, by the UE, the communication network based on respective traffic capacities of the one or more communication networks. Selecting the communication network may be based on a profile associated with the UE. The profile may include pricing preferences and/or traffic preferences of a user of the UE.

In some embodiments, selecting the communication network out of the one or more communication networks may include receiving, from the node of the OBCCN, information associated with pricing information from the one or more MNOs associated with the one or more communication networks, and selecting, by the UE, the communication network based on the information associated with the pricing information from the one or more MNOs. The pricing information may be obtained by the node of the OBCCN by periodically polling the one or more MNOs to obtain updated pricing information for selection of the communication network for use by the UE. Selecting the communication network out of the one or more communication networks may include receiving, from the node of the OBCCN, respective traffic capacities related to the one or more communication networks associated with the one or more MNOs, and selecting, by the UE, the communication network based on the respective traffic capacities related to the one or more communication networks.

In some embodiments, selecting the communication network out of the one or more communication networks may include receiving, from the node of the OBCCN, pricing information for the one or more MNOs associated with the one or more communication networks, and selecting, by the UE, the communication network out of the one or more communication networks based on the pricing information.

According to some embodiments, the method of Claim may include receiving, from the node of the OBCCN, an offline map for use when not in communication with the OBCCN. The offline map may include respective geographic locations of the UE associated with corresponding ones of the one or more communication networks. The offline map may include associations with the one or more communication networks that were previously used when the UE was in corresponding ones of the geographic locations. A communication channel of the OBCCN between the node and the UE may include a secure communication channel.

Various embodiments of the present invention are directed to a computer program product including a non-transitory computer readable storage medium including computer readable program code therein that when executed by a processor causes the processor to perform the operations described herein.

Various embodiments of the present invention are directed to an electronic device of an Out of Band Control Channel Network (OBCCN) for selecting a communication network for use by a User Equipment (UE). The electronic device includes a processor configured to perform operations including determining one or more communication networks that are available to provide service to the UE, selecting, by the electronic device of the OBCCN, the communication network out of the one or more communication networks that are available, and providing, by the electronic device of the OBCCN, control information to the UE for connecting to the communication network that was selected. The OBCCN is operated independently from one or more Mobile Network Operators (MNOs) associated with the one or more communication networks.

Various embodiments of the present invention are directed to a wireless electronic device for communicating over a communication network. The wireless electronic device includes a processor configured to perform operations including connecting to a node of an Out of Band Control Channel Network (OBCCN), receiving, from the node of the OBCCN, status information associated with one or more communication networks, and selecting the communication network out of the one or more communication networks based on the status information received from the node of the OBCCN. The OBCCN is operated independently from one or more Mobile Network Operators (MNOs) associated with the one or more communication networks.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Figure 1:
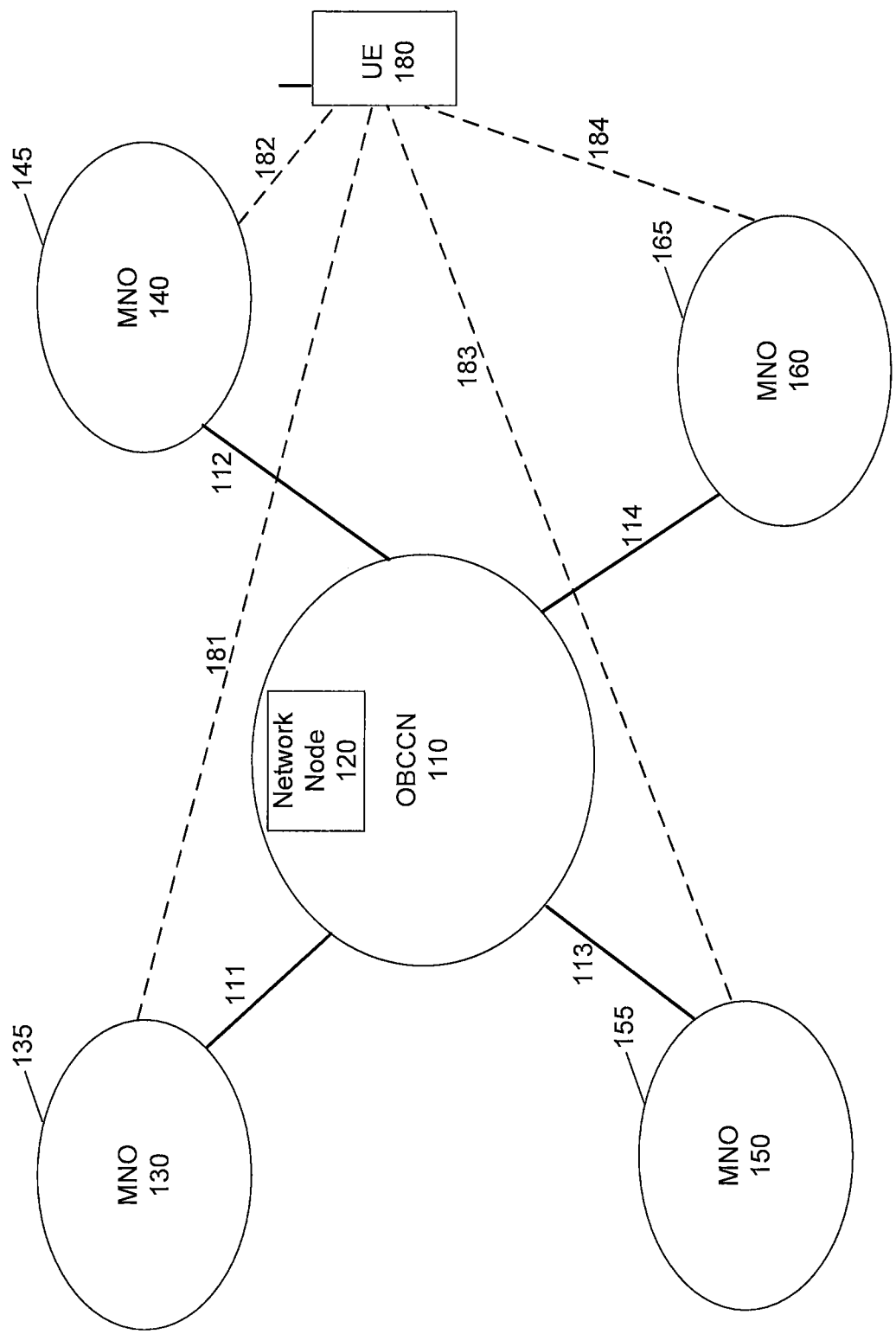
FIG. 1 illustrates a communication system including communication networks associated with MNOs, an OBCCN, and a UE, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Use of various communication networks across licensed and unlicensed spectrum is a common practice for UEs in wireless communication networks. Various networks such as cellular, data, Wifi, LTE, 5G, etc. may be available. These various networks may be controlled by MNOs, i.e. service providers. However, in current practice, the UE may be controlled by the MNO with which the UE has service. For example, a user may have a mobile device that is connected to a specific MNO, such as the VERIZON® network. The UE may be handed over to another spectrum such as the unlicensed spectrum or roam to a different MNO's network, but may still be under the control of the MNO where the UE is a subscriber. The subscriber's MNO may have agreements with other networks on which the UE's service may be transferred. An out of band control channel may provide control operations for the communication channels used by the UE. Typically, the UE may be under the control of a home MNO of which the user of the UE is a subscriber while in the network coverage area. When the UE roams to a different area, the UE undergoes an autonomous registration process with the roaming MNO. The roaming MNO may communicate with the home MNO to confirm that the UE may obtain service temporarily from the roaming MNO. However, roaming decisions made by the home MNO are in the best interests of the MNO, which may not align with the best interests of the UE. For example, the home MNO may keep the UE on the home MNO's network, even when there is poor signal quality and better signal quality may be available by roaming to a different MNO.

Various embodiments described herein arise from the recognition that decisions made by the MNO that controls a subscriber UE may not be in the best interest of the user of the UE with respect to pricing, channel quality, bandwidth, capacity, etc. According to various embodiments, an out of band control channel network (OBCCN) may be independent from the control of one or more MNOs such that control decisions for the UE may be made independently of a specific MNO. In other words, the UE may move connections to networks operated by various MNOs, Wifi networks, and/or unlicensed spectrums that are in the best interest of the user of the UE. The OBCCN may be an independent network which provides preference to the UE based on network quality, capacity, bandwidth, and/or cost of network usage. In other words, the OBCCN may make decisions based on the best interests of the user of the UE, which may or may not align with the interests of one or more MNOs, Wifi networks, and/or unlicensed spectrum operators.

As used herein, the term "user equipment (UE)" may include a personal computer, a satellite or cellular radiotelephone with or without a display, a Personal Communications System (PCS) terminal that may combine a cellular radiotelephone with data processing, facsimile and data communications capabilities, a Personal Digital Assistant (PDA) or smart phone that can include a radiotelephone, pager, Internet/intranet access, Web browser, organizer, calendar and/or a Global Positioning System (GPS) receiver, a conventional laptop and/or palmtop receiver, and/or other appliance that includes a communication transceiver. As used herein, a "wireless electronic device" may include any of the types of devices that perform as a user device. A "wireless electronic device" may include a mobile device, tablet, laptop, or other devices that include a wireless communication transceiver and/or a processor. A "node" may include servers, data center equipment, or other electronic devices that include a communication transceiver and/or a processor and are part of a OBCCN or MNO. As used herein, a "Mobile Network Operators (MNO)" may include a service provider, network operator, web hosting service, Internet/Intranet administrator nodes, and/or other nodes in a communications network. An "out of band control channel network (OBCCN)" may include various nodes or other devices that communicate with UEs to provide an out of band control channel. The out of band control channel may be on a separate channel or may share channels for cellular, data, and voice traffic. In some cases, the out of band control channel may be used for data traffic in addition to providing access control, contingent upon availability of data capacity in the out of band control channel.

Various embodiments described herein include UEs that have capability to connect to multiple MNO networks such as, for example, VERIZON®, AT&T®, SPRINT®, and/or COMCAST® as well as to various Wifi networks, such as MNO controlled Wifi networks or third party Wifi networks. A UE such a mobile device may have a mobile telephone number, token, or other identifier that is independent of various carriers such that the OBCCN may facilitate connection to various communication networks. A user of a UE may be subscriber to one or more MNOs and may subscribe to the OBCCN for better options for network access. The OBCCN may be tasked with making network selection decisions for the UE that are in the best interests of the UE based on UE user profiles and/or other parameters.

The OBCCN may be responsible for determining a suitable network for the UE based on considerations such as time, location, data requirements, etc. The OBCCN will facilitate the UE to act as a subscriber of a selected communication network by managing connections to various communication networks such as cellular networks and/or Wifi networks. In some embodiments, the OBCCN may add security over the communication between the UE and the communication network to provide an additional security layer for communication. This extra layer of security may include encryption/decryption, security keys, access control, analytics analysis, firewalls, performance analysis, etc. The OBCCN may keep track of access points, passwords, security parameters, and other connection management information. As used herein, the OBCCN may include one or more nodes including processors and/or memory units that are part of a control network and provide the functionalities of the OBCCN described herein. A node of the OBCCN may be an electronic device that is responsible for the functionalities described herein.

According some embodiments, the UE may receive a download of status information from the OBCCN, when there is OBCCN coverage. The UE may maintain a real time connection with the OBCCN when such connection to the OBCCN is available. The OBCCN may direct the UE to use the OBCCN network for control traffic and/or for data traffic, if such capacity is available. The OBCCN may decide to not use its network for data traffic even when capacity is available to make sure the primary function of connecting the UE is not impaired. The OBCCN may direct the UE to use the network which has the best performance, pricing, and/or contractual terms.

According to some embodiments, the OBCCN may provide the UE with an offline map. An offline map may provide a map of geographical locations for use by the UE when the UE is not in an OBCCN coverage area. The offline map may provide suggestions for communication networks to use, based on the location of the UE and previous historic traveling patterns. The OBCCN will make a determination and/or provide an ordering to the UE of which communication networks will be more suitable for the UE while the UE is out of the coverage area of the OBCCN. In these cases, the UE can make an informed decision related to selection of the communication network based on an ordering of networks provided by the OBCCN and/or other information provided by the OBCCN. The OBCCN may select the communication network for the UE to use when the UE has an active connection to the OBCCN. However, if the UE is not actively connected to the OBCCN, the UE may make the selection of the communication network for use based on previously provided information from the OBCCN.

When connected to the OBCCN, the UE may periodically listen for the OBCCN and receive a new map when in OBCCN coverage. The updated map from the OBCCN may include contractual terms such as carry over of unused capacity from a prior time period. The UE may then make a determination of which MNO is favorable from the user's or UE's perspective.

A non-limiting example will be discussed to aid in understanding some of the embodiments described herein. If a COMCAST® subscriber is to use the OBCCN (operated by COMCAST® or another independent third party), the UE may use a portion of the communication network where there is coverage from a COMCAST® unlicensed Wifi coverage spot. If there is no adequate coverage, the OBCCN may make a determination if there is coverage from AT&T®, VERIZON®, T-MOBILE®, and/or other MNOs. The OBCCN may also make a determination regarding which communication network is suitable based on considerations such as network quality, pricing, profile and/or other contractual terms. Since mobile devices are already equipped with multi-band functionality and are capable of using multiple networks, implementation of the various embodiments described herein may be easily achieved. The user may obtain improved service and pricing without being subject to the considerations of a single network operator. The OBCCN may be impartial in providing such choices of communications networks that have been discussed. The OBCCN may also take cyber security considerations as a parameter in network decisions.

According to some embodiments, an auction mechanism may be used by the OBCCN to select the communication network used by the UE out of the available communication networks. The OBCCN may obtain bids from various MNOs associated with various communication and/or Wifi networks. These bids may include considerations such as pricing, bandwidth, capacity, latency, signal quality, user profile, etc. The OBCCN and/or the UE may make a decision of which communication network to use based on the bids from the MNOs. The bids may be obtained by polling periodically or at other times based on conditions such as channel quality, or an auction may occur in real time after a UE indicates the need to connect to a network.

Various MNOs associated with communication networks may provide bids related to cost, capacity, etc. to the OBCCN, which are taken into consideration in selecting a communication network.

Legacy communication networks associated with respective MNOs may use overall network capacity or radio spectrum inefficiently since different MNOs may have overlapping coverage capacity that is not fully used by various UEs in the coverage area since different UEs may use different MNOs at a given time. Using an OBCCN that makes network usage decisions independently from the MNOs may provide improved efficiency in the overall usage of spectrum and capacity in a geographical area. Specifically, less spectrum and capacity is wasted since the OBCCN may view all available spectrum and capacity across various MNO controlled communication networks in making connection allocation decisions. In other words, the OBCCN may coordinate spectrum usage in a geographical area to improve efficiencies across various networks covering the geographical area.

The following discussion related to drawings will aid in providing a better understanding of the previously discussed concepts. FIG. 1 illustrates a communication system including communication networks associated with MNOs, an OBCCN, and a UE. Flowcharts in FIGS. 2 to 13 will provide details related to operations performed by a node of the OBCCN and/or the UE. Referring now to FIG. 1, an OBCCN 110 may be in communication with several MNOs 130, 140, 150, 160 associated with respective communication networks 135, 145, 155, 165. The OBCCN 110 may include a node 120 for performing various operations described herein. The OBCCN 110 may be connected to a wireless electronic device such as UE 180. The OBCCN 110 may facilitate UE 180 to connect to one or more communication networks 135, 145, 155, 165 associated with respective MNOs 130, 140, 150, 160, according to various embodiments described herein. Control channel information may be transmitted between the UE 180 and the OBCCN 110. Data communication 181, 182, 183, 184 to/from the UE may be transmitted and/or received from respective communication networks 135, 145, 155, 165 associated with MNO 130, 140, 150, 160 either directly from the UE 180 or indirectly through the OBCCN 110. In some embodiments, once the OBCCN 110 is used to select a communication network 135, 145, 155, 165 associated with an MNO 130, 140, 150, 160, the UE 180 may directly communicate with the communication network 135, 145, 155, 165 associated with a selected MNO 130, 140, 150, and/or 160. The MNOs 130, 140, 150, 160 of FIG. 1 may represent service providers, Wifi network operators, and/or third party communication network providers that own and/or control access to communication networks 135, 145, 155, 165. The OBCCN 110 may communicate with MNOs 130, 140, 150, 160 via communication links 111, 112, 113, 114, respectively. Communication links 111, 112, 113, 114 may be wired or wireless using protocols and/or frequencies associated with cellular, Wifi, LTE, 5G, or other communication protocols and/or frequencies.

Figure 2:
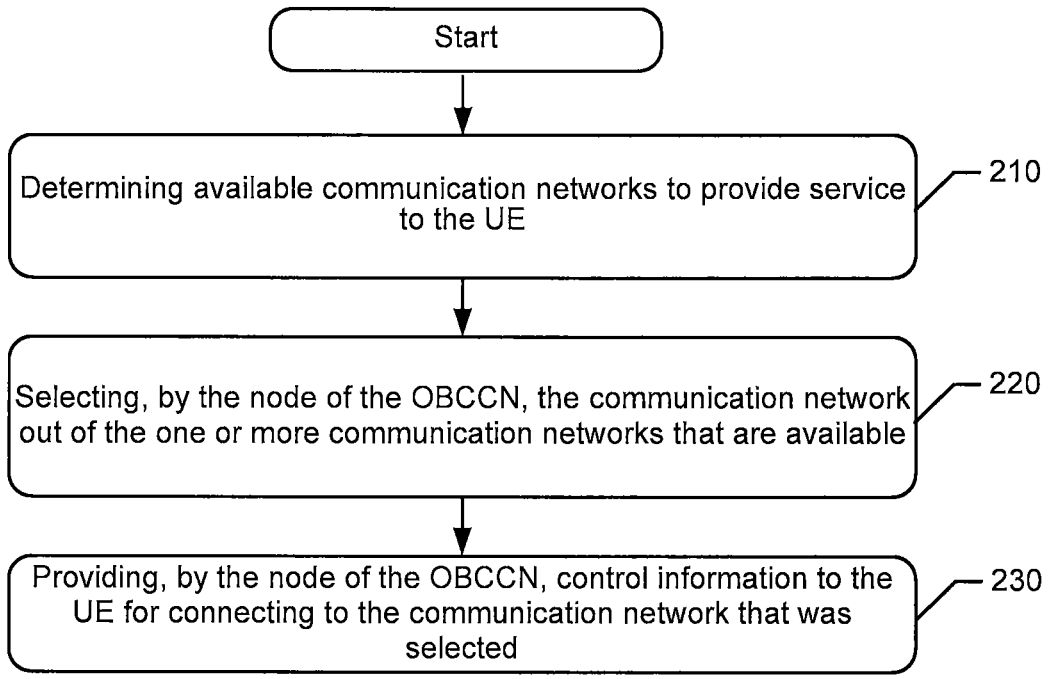
FIGS. 2 to 13 are flowcharts of operations using an out of band communication network to facilitate selection of a communication network for use by a UE, according to various embodiments described herein.

FIGS. 2 to 7 are flowcharts of operations by a node of an out of band communication network (OBCCN) 110 facilitating a UE 180 to select a communication network 135, 145, 155, 165 associated with a respective MNO 130, 140, 150, 160 of FIG. 1, according to various embodiments described herein. Referring to FIG. 2, communication networks 135, 145, 155, 165 that are available to provide service to the UE 180 may be determined, at block 210. The node 120 of the OBCCN 110 may select a communication network out of the communication networks 135, 145, 155, 165 that are available, at block 220. The node 120 of the OBCCN 110 may provide control information to the UE 180 for connecting to the communication network 135, 145, 155 or 165 that was selected, at block 230. The OBCCN may be operated independently from the MNOs associated with the one or more communication networks 135, 145, 155, 165. In other words, the MNOs may not control the decisions made by the OBCCN such that the OBCCN 110 be able to independently take into consideration the available characteristics of various MNOs.

Figure 3:
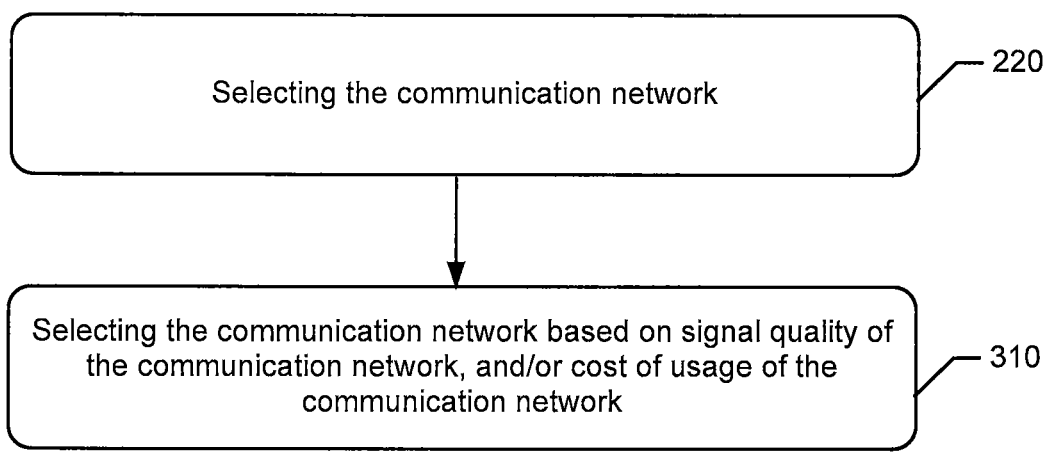

Referring to FIG. 3, selecting the communication network of block 220 may include selecting the communication network 135, 145, 155, or 165 based on signal quality of the communication network, and/or cost of usage of the communication network, at block 310.

Figure 4:
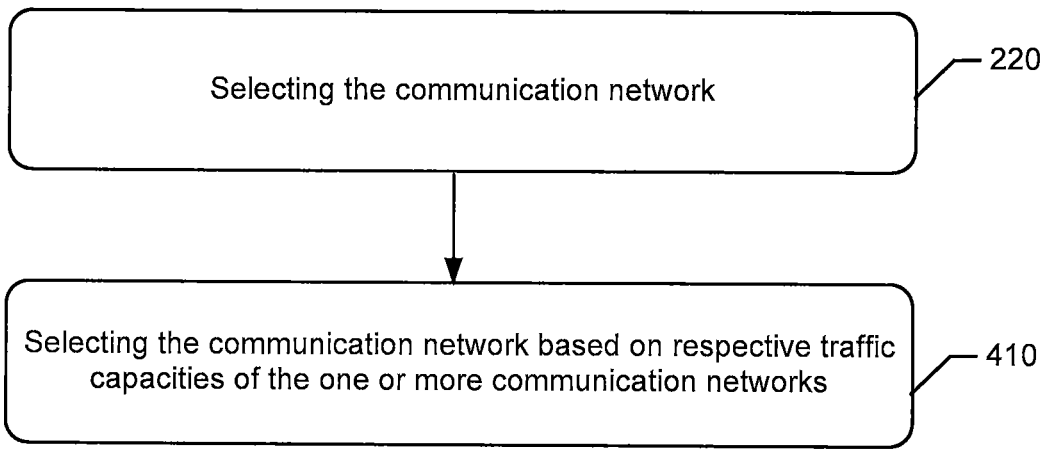

Referring to FIG. 4, selecting the communication network of block 220 may include selecting the communication network 135, 145, 155, or 165 based on respective traffic capacities of the one or more communication networks 135, 145, 155, and/or 165, at block 410. In some embodiments, selecting the communication network may be based on a profile associated with the UE 180. The profile may include pricing preferences and/or traffic preferences of a user of the UE 180.

Figure 5:
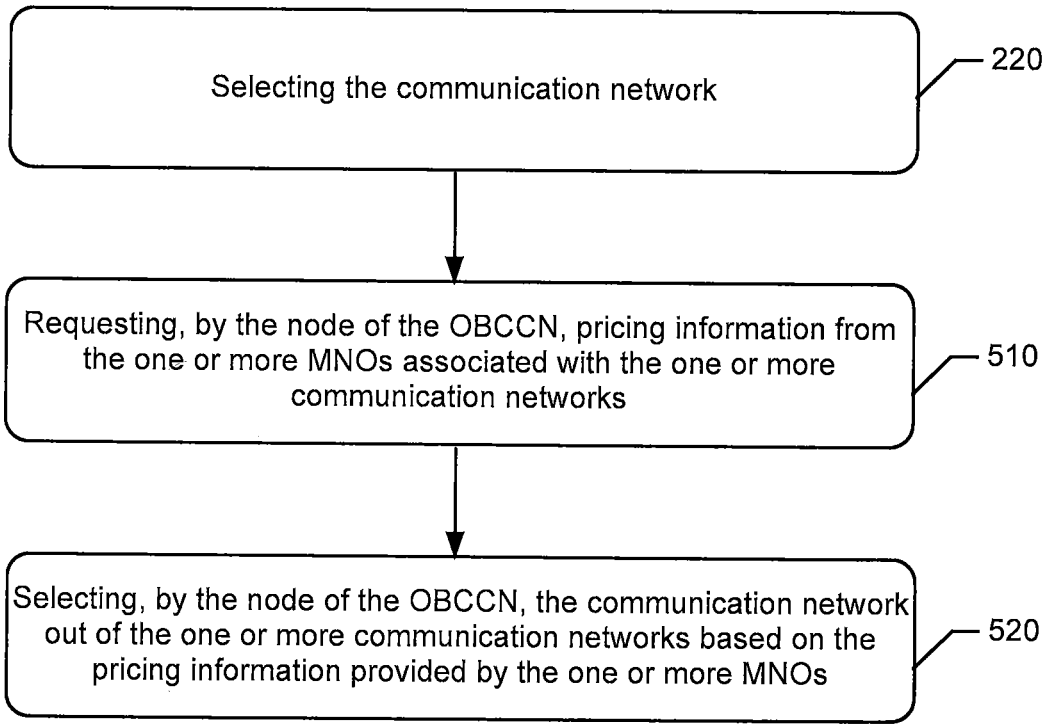

Referring to FIG. 5, selecting the communication network of block 220 may include requesting, by the node 120 of the OBCCN 110, pricing information from the one or more MNOs 130, 140, 150, 160 associated with the one or more communication networks 135, 145, 155, or 165, at block 510. The communication network out of the one or more communication networks 135, 140, 150, 160 may be selected by the node 120 of the OBCCN 110 based on the pricing information provided by the one or more MNOs 130, 140, 150, 160, at block 520. The pricing information may be requested by periodically polling the one or more MNOs 130, 140, 150, 160 to obtain updated pricing information for selection of the communication network 135, 145, 155, or 165 for use by the UE 180.

Figures 6, 7, 8:
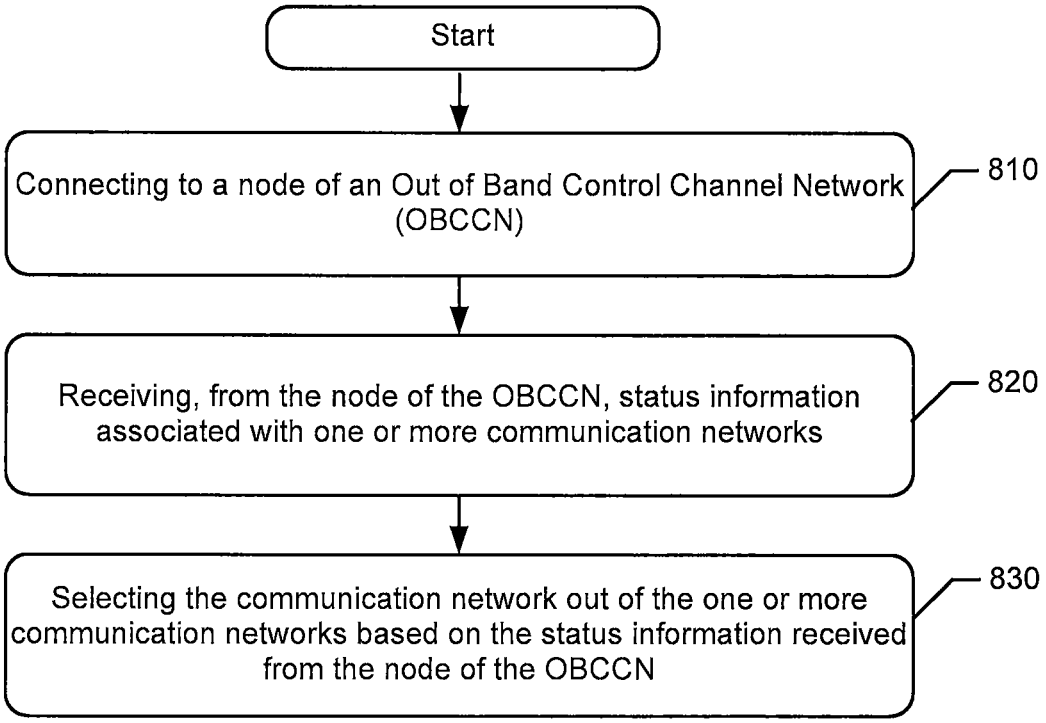

Referring now to FIG. 6, the node 120 of the OBCCN 110 may determine respective traffic capacities related to the one or more communication networks 135, 145, 155, 160 associated with the one or more MNOs 130, 140, 150, 160, at block 610. The communication network may be selected based on the respective traffic capacities related to the one or more communication networks 135, 145, 155, 165.

Referring now to FIG. 7, an offline map may be provided to the UE 180 for use when the OBCCN 110 is not in communication with the UE 180, at block 710. The offline map may include respective geographic locations associated with corresponding ones of the one or more communication networks 135, 145, 155, 165. The offline map may be provided by the OBCCN 110 or may be generated by the UE 180 based on information provided to or collected by the UE 180. In some embodiments, the offline map may include associations with the one or more communication networks 135, 145, 155, 165 that were previously used when the UE 180 was in corresponding ones of the geographic locations. A communication channel between the node 120 of the OBCCN 110 and the UE 180 may include a secure communication channel. The communication channel between the OBCCN and the UE may have a security layer for secure communication. This extra layer of security may include encryption/decryption, security keys, access control, analytics analysis, firewalls, performance analysis, etc. The node of the OBCCN may keep track of access points, passwords, security parameters, and other connection management information.

FIGS. 8 to 13 are flowcharts of operations by a UE 180 in communication with a node 120 of an OBCCN 110 facilitating selection of a communication network 135, 145, 155, 165 associated with a respective MNO 130, 140, 150, 160 of FIG. 1, according to various embodiments described herein. Referring to FIG. 8, a UE 180 connects to a node 120 of an OBCCN 110, at block 810. The UE 180 may receive, from the node of the OBCCN 110 using communication links 181, 182, 183, and/or 184 of FIG. 1, status information associated with one or more communication networks 135, 145, 155, 165, at block 820. A communication network may be selected out of the one or more communication networks 135, 145, 155, 165 based on the status information received from the node 120 of the OBCCN 110, at block 830. The OBCCN may be operated independently from one or more MNOs 130, 140, 150, 160 associated with the one or more communication networks 135, 145, 155, 165.

Figure 9:
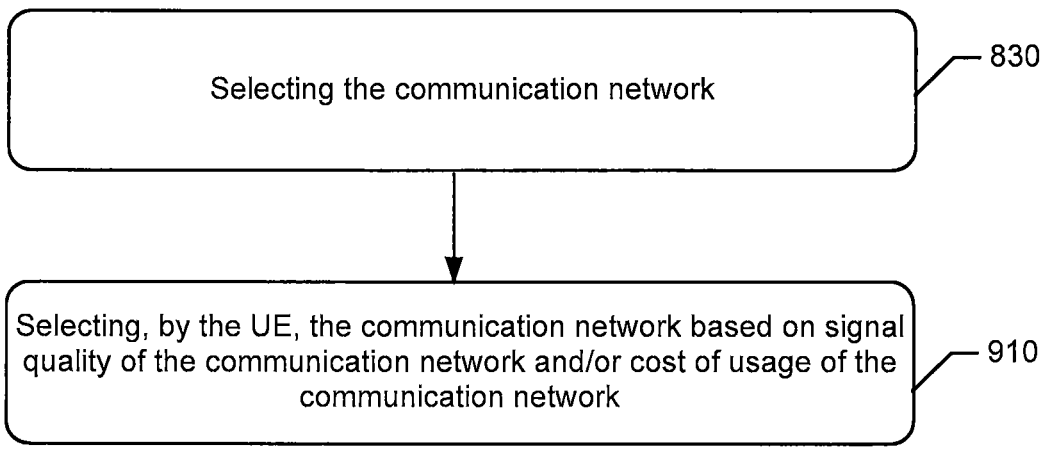

Referring to FIG. 9, selecting the communication network out of the one or more communication networks 135, 145, 155, 165, at block 830 may include selecting, by the UE 180, the communication network based on signal quality of the communication network and/or cost of usage of the communication network, at block 910.

Figure 10:
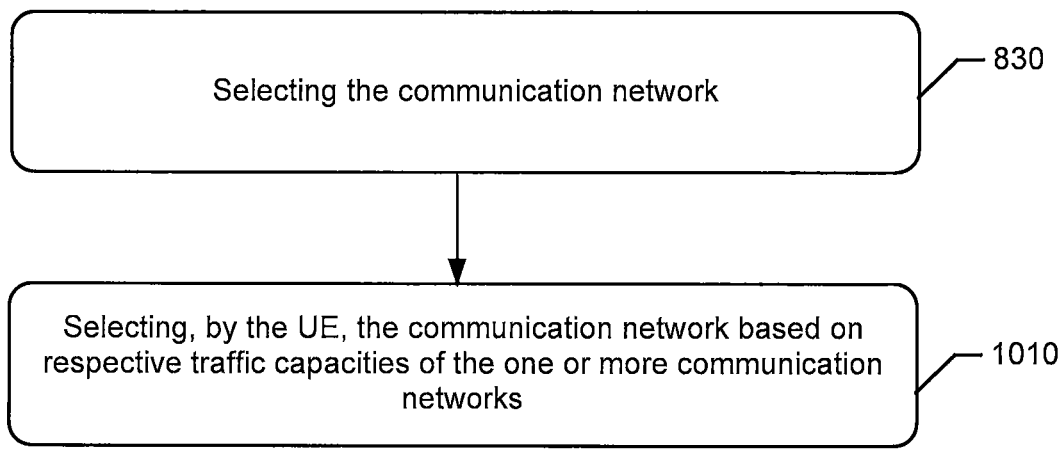

Referring to FIG. 10, selecting the communication network out of the one or more communication networks 135, 145, 155, 165, at block 830 may include selecting, by the UE 180, the communication network based on respective traffic capacities of the one or more communication networks 135, 145, 155, 165, at block 1010. Selecting the communication network may be based on a profile associated with the UE 180. The profile may include pricing preferences and/or traffic preferences of a user of the UE 180.

Figure 11:
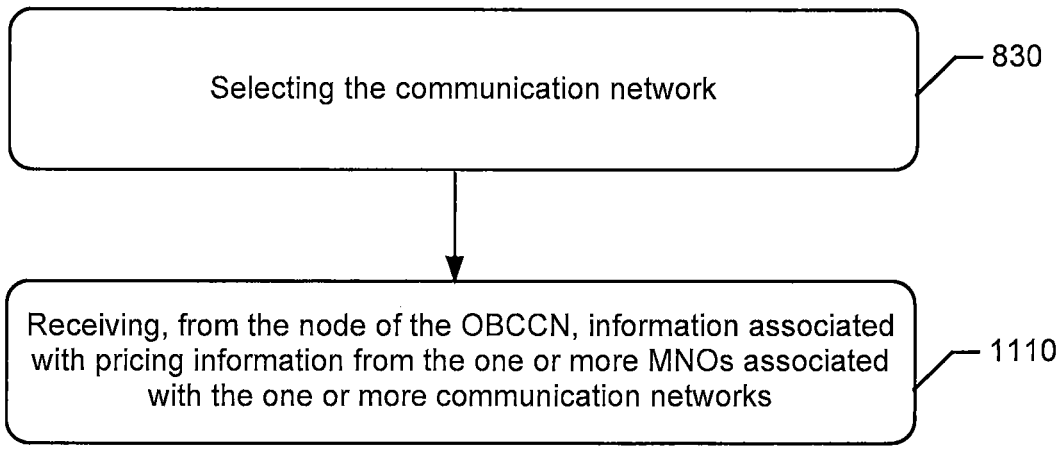

Referring to FIG. 11, selecting the communication network out of the one or more communication networks 135, 145, 155, 165, at block 830 may include receiving, from the node 120 of the OBCCN 110, information associated with the communication network that has been selected based on pricing information from the one or more MNOs 130, 140, 150, 160 associated with the one or more communication networks 135, 145, 155, 165. The pricing information may be obtained by the node 120 of the OBCCN 110 by periodically polling the one or more MNOs 130, 140, 150, 160 to obtain updated pricing information for selection of the communication network for use by the UE 180.

Figure 12:
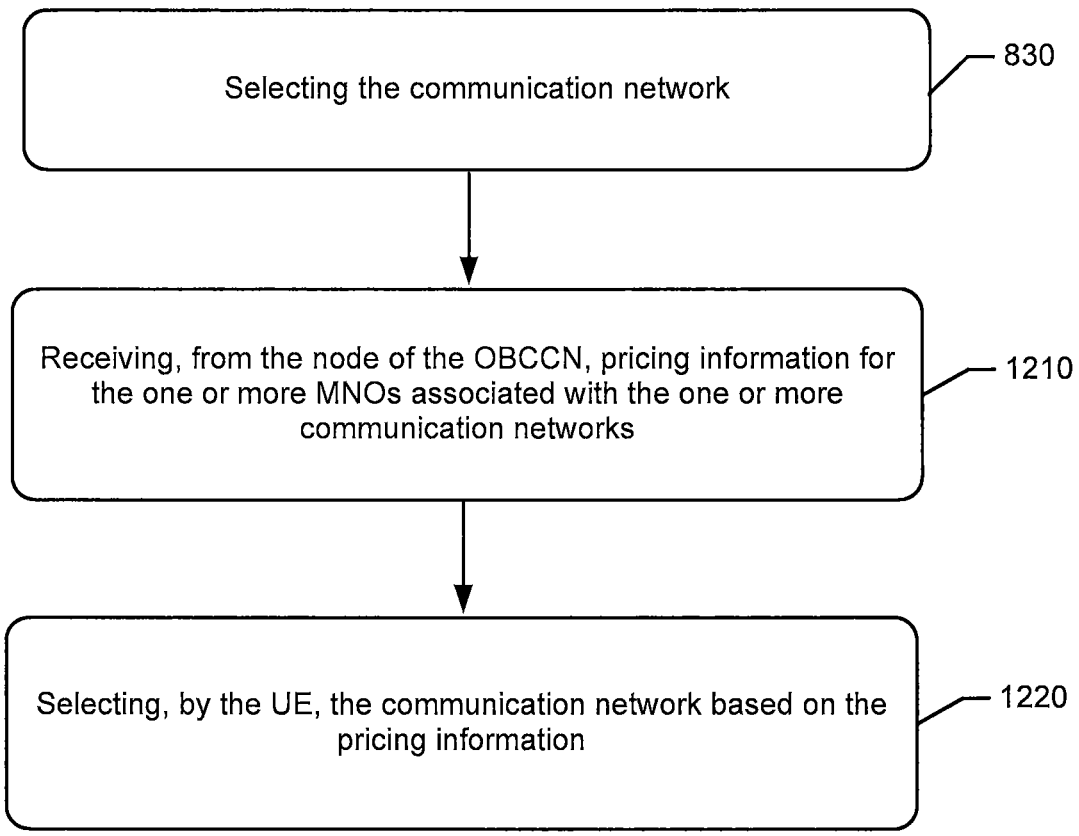

Referring to FIG. 12, selecting the communication network out of the one or more communication networks 135, 145, 155, 165, at block 830 may include receiving, from the node 120 of the OBCCN 110, respective pricing information related to the one or more communication networks 135, 145, 155, 165 associated with the one or more MNOs 130, 140, 150, 160, at block 1210. The communication network may be selected by the UE 180, based on the respective pricing information of the one or more communication networks 135, 145, 155, 165, at block 1220.

Figure 13:
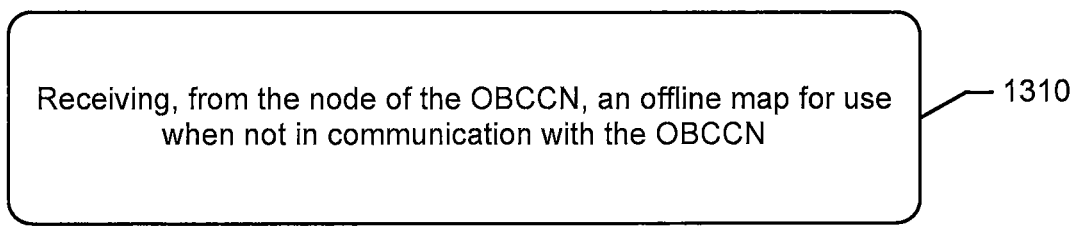

Referring to FIG. 13, the UE 180 may receive, from the node of the OBCCN, an offline map for use when the UE is not in communication with the OBCCN 110, at block 1310. The offline map may include respective geographic locations associated with corresponding communication networks 135, 145, 155, 165. The offline map may not necessarily be a physical map, but may include coordinates or other location information. The offline map may include associations with communication networks 135, 145, 155, 165 that were previously used when the UE 180 was in various the geographic locations. The geographic location of the offline map may be geographic locations of the UE when using respective ones of the communication networks 135, 145, 155, 165. In other words, the geographic locations of the offline map may indicate that when a UE is located in a specific geographical area, the UE should use a specific communication network of the communication networks 135, 145, 155, 165. In some embodiments, a communication channel over the OBCCN 110 between the node 120 and the UE 180 for transferring information such as the offline map may include a secure communication channel. The communication channel between the OBCCN and the UE may have a security layer for secure communication. This extra layer of security may include encryption/decryption, security keys, access control, analytics analysis, firewalls, performance analysis, etc.

Figure 14:
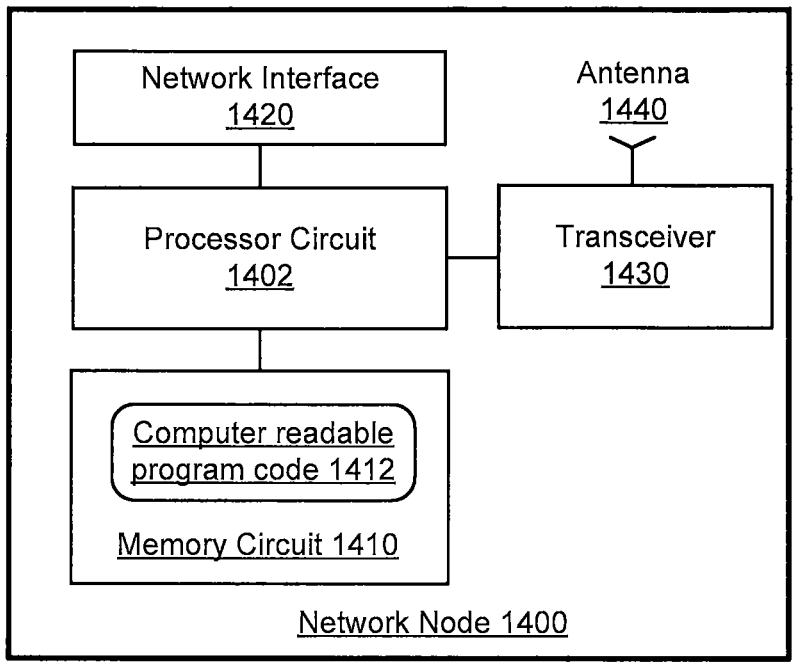
FIGS. 14 to 17 are block diagrams of devices for using an out of band communication network to facilitate selection of a communication network for use by a UE, according to various embodiments described herein.
Figure 15:
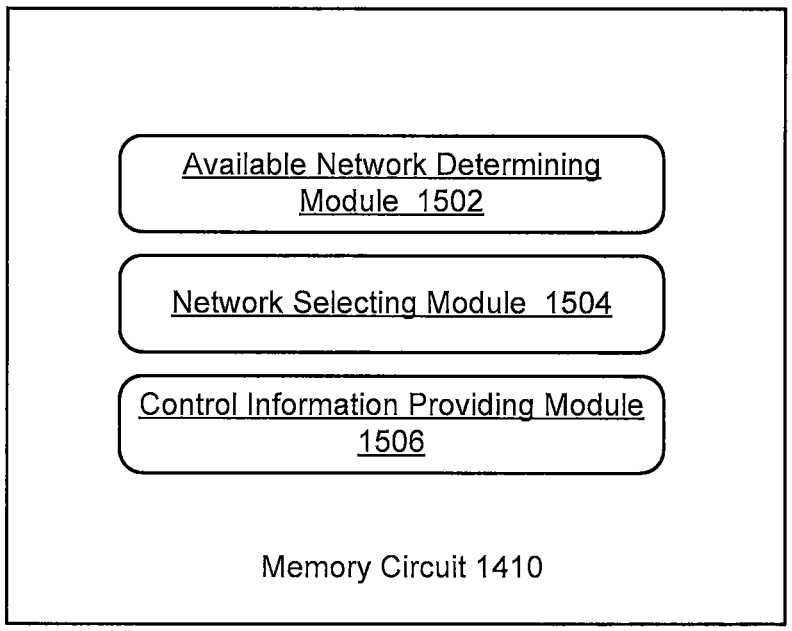

FIGS. 14 and 15 are block diagrams of electronic devices for using an OBCCN 110 of FIG. 1 to facilitate selection of a communication network for use by the UE 180, according to various embodiments described herein. Referring to FIG. 14, electronic device 1400, such as a node 120 of an OBCCN 110 of FIG. 1 may include a network interface 1420, a processor circuit 1402, a transceiver 1430 that may have an antenna 1440 for wireless communication, and a memory circuit 1410 that stores computer readable program code 1412. The processor or processor circuit 1402 may include one or more data processing circuits, such as a general purpose and/or special purpose processor, e.g., microprocessor and/or digital signal processor, which may be collocated or distributed across one or more networks. The processor circuit 1402 is configured to execute the computer readable program code 1412 in the memory 1410 to perform at least some of the operations and methods of described herein as being performed by the electronic device 1400/node 120 of OBCCN 110. A wireless interface may be coupled to the processor circuit 1402 and may communicate with a UE, MNO, or other external network entity, directly or indirectly.

Referring to FIG. 15, the computer readable program code 1412 of the memory circuit 1410 of FIG. 14 may include an available network determining module 1502, a network selecting module 1504, and a control information providing module 1506. Modules 1502, 1504, and 1506 may perform the operations of FIG. 2.

Figure 16:
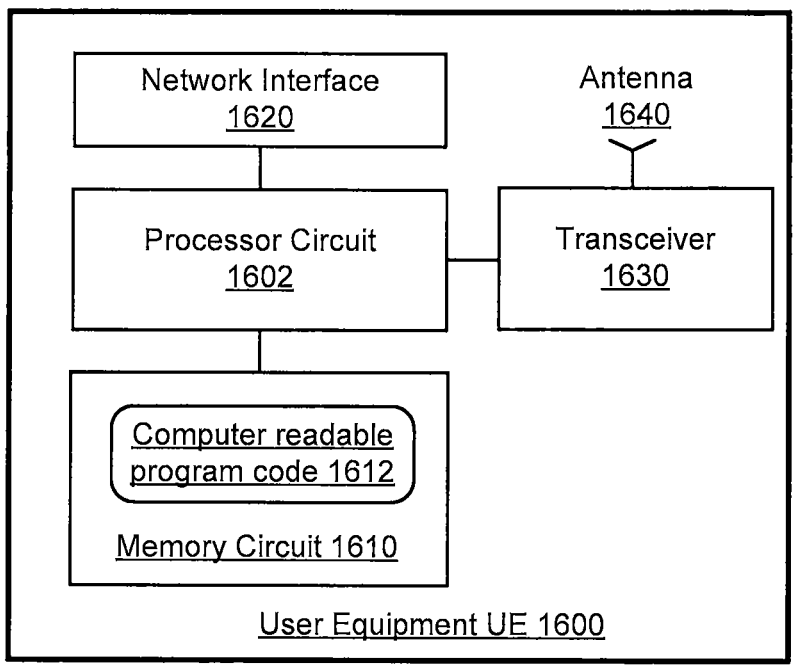
Figure 17:
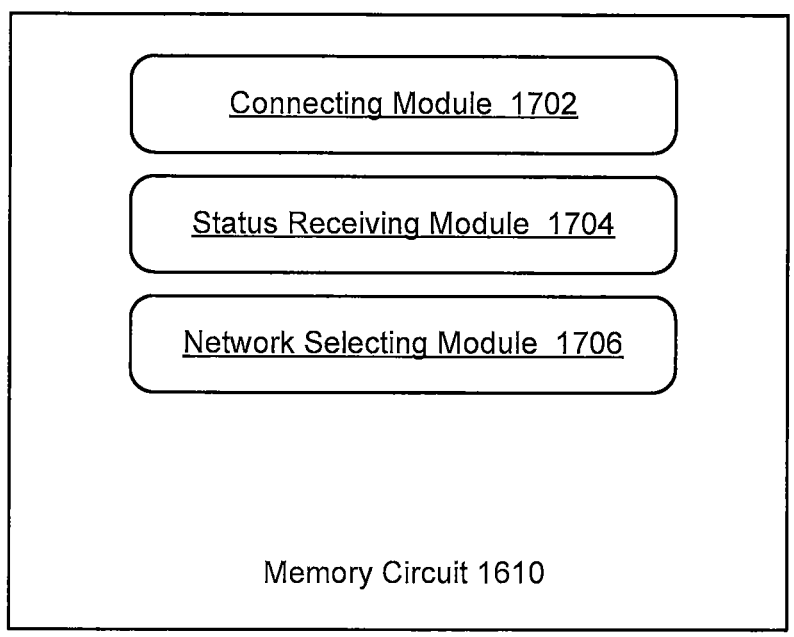

FIGS. 16 and 17 are block diagrams of wireless electronic devices for using an OBCCN 110 of FIG. 1 to facilitate selection of a communication network for use by a UE, according to various embodiments described herein. Referring to FIG. 16, wireless electronic device 1600, such as UE 180 of FIG. 1, may include a network interface 1620, a processor circuit 1602, a transceiver 1630 that may have an antenna 1640 for wireless communication, and a memory circuit 1610 that stores computer readable program code 1612. The processor or processor circuit 1602 may include one or more data processing circuits, such as a general purpose and/or special purpose processor, e.g., microprocessor and/or digital signal processor, which may be collocated or distributed across one or more networks. The processor circuit 1602 is configured to execute the computer readable program code 1612 in the memory 1610 to perform at least some of the operations and methods of described herein as being performed by the wireless electronic device 1600/UE 180. A wireless interface may be coupled to the processor circuit 1602 and may communicate with a node of the OBCCN, MNO, or other external network entity, directly or indirectly.

Referring to FIG. 17, the computer readable program code 1612 of the memory circuit 1610 may include a connecting module 1702, a status receiving module 1704, and a network selecting module 1706. Modules 1702, 1704, and 1706 may perform the operations of FIG. 8.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method for selecting a communication network by a node of an Out of Band Control Channel Network (OBCCN) for use by a User Equipment (UE), the method comprising:
   determining a plurality of communication networks that are available to provide service to the UE;
   selecting, by the node of the OBCCN, the communication network out of the plurality of communication networks that are available;
   providing, by the node of the OBCCN, control information to the UE for connecting to the communication network that was selected; and
   providing, by the node of the OBCCN, an offline map to the UE for use when the OBCCN is not in communication with the UE,
   wherein the OBCCN is operated independently from one or more Mobile Network Operators (MNOs) associated with the plurality of communication networks,
   wherein the offline map comprises respective geographic locations of the UE associated with the plurality of communication networks, and
   wherein the offline map comprises associations with the plurality of communication networks that were previously used when the UE was in the respective ones of the geographic locations.

2. The method of claim 1, wherein the selecting the communication network comprises:
   selecting the communication network based on signal quality of the communication network, and/or cost of usage of the communication network.

3. The method of claim 1, wherein the selecting the communication network comprises:
   selecting the communication network based on respective traffic capacities of the plurality of communication networks.

4. The method of claim 1,
   wherein the selecting the communication network is based on a profile associated with the UE, and
   wherein the profile comprises pricing preferences and/or traffic preferences of a user of the UE.

5. The method of claim 1, wherein the selecting the communication network comprises:
   requesting, by the node of the OBCCN, pricing information from the one or more MNOs associated with the plurality of communication networks; and
   selecting, by the node of the OBCCN, the communication network out of the plurality of communication networks based on the pricing information provided by the one or more MNOs.

6. The method of claim 5,
   wherein the pricing information is requested by periodically polling the one or more MNOs to obtain updated pricing information for selection of the communication network for use by the UE.

7. The method of claim 1, further comprising:
   determining, by the node of the OBCCN, respective traffic capacities related to the plurality of communication networks associated with the one or more MNOs,
   wherein the communication network is selected based on the respective traffic capacities related to the plurality of communication networks.

8. The method of claim 1,
   wherein a communication channel of the OBCCN between the node and the UE comprises a secure communication channel.

9. A method for communicating over a communication network by a User Equipment (UE), the method comprising:
   connecting to a node of an Out of Band Control Channel Network (OBCCN);
   receiving, from the node of the OBCCN, status information associated with a plurality of communication networks;
   selecting the communication network out of the plurality of communication networks based on the status information received from the node of the OBCCN; and
   receiving, from the node of the OBCCN, an offline map for use when the UE is not in communication with the OBCCN,
   wherein the OBCCN is operated independently from one or more Mobile Network Operators (MNOs) associated with the plurality of communication networks, wherein the offline map comprises respective geographic locations of the UE associated with the plurality of communication networks, and wherein the offline map comprises associations with the plurality of communication networks that were previously used when the UE was in corresponding ones of the geographic locations.

10. The method of claim 9, wherein the selecting the communication network out of the plurality of communication networks comprises:

selecting, by the UE, the communication network based on signal quality of the communication network and/or cost of usage of the communication network.

11. The method of claim 9, wherein the selecting the communication network out of the plurality of communication networks comprises:

selecting, by the UE, the communication network based on respective traffic capacities of the plurality of communication networks.

12. The method of claim 9, wherein the selecting the communication network is based on a profile associated with the UE, and wherein the profile comprises pricing preferences and/or traffic preferences of a user of the UE.

13. The method of claim 9, wherein the selecting the communication network out of the plurality of communication networks comprises:

receiving, from the node of the OBCCN, information associated with pricing information from the one or more MNOs associated with the plurality of communication networks; and selecting, by the UE, the communication network based on the information associated with the pricing information from the one or more MNOs.

14. The method of claim 13, wherein the pricing information was obtained by the node of the OBCCN by periodically polling the one or more MNOs to obtain updated pricing information for selection of the communication network for use by the UE.

15. The method of claim 9, wherein the selecting the communication network out of the plurality of communication networks comprises:

receiving, from the node of the OBCCN, respective traffic capacities related to the plurality of communication networks associated with the one or more MNOs;

selecting, by the UE, the communication network based on the respective traffic capacities related to the plurality of communication networks.

16. The method of claim 9, wherein a communication channel of the OBCCN between the node and the UE comprises a secure communication channel.

17. A node configured to perform the method of claim 1.

18. A UE configured to perform the method of claim 9.

19. A computer program product comprising:

a non-transitory computer readable storage medium comprising computer readable program code therein that when executed by a processor causes the processor to perform the method of claim 1.

20. An electronic device of an Out of Band Control Channel Network (OBCCN) for selecting a communication network for use by a User Equipment (UE), the electronic device comprising:

a processor configured to perform operations comprising:

determining a plurality of communication networks that are available to provide service to the UE;

selecting, by the electronic device of the OBCCN, the communication network out of the plurality of communication networks that are available;

providing, by the electronic device of the OBCCN, control information to the UE for connecting to the communication network that was selected; and providing, by the electronic device of the OBCCN, an offline map to the UE for use when the OBCCN is not in communication with the UE, wherein the OBCCN is operated independently from one or more Mobile Network Operators (MNOs) associated with the plurality of communication networks, wherein the offline map comprises respective geographic locations of the UE associated with the plurality of communication networks, and wherein the offline map comprises associations with the plurality of communication networks that were previously used when the UE was in corresponding ones of the geographic locations.

21. A wireless electronic device for communicating over a communication network, the wireless electronic device comprising:

a processor configured to perform operations comprising:

connecting to a node of an Out of Band Control Channel Network (OBCCN);

receiving, from the node of the OBCCN, status information associated with a plurality of communication networks;

selecting the communication network out of the plurality of communication networks based on the status information received from the node of the OBCCN; and receiving, from the node of the OBCCN, an offline map for use when the wireless electronic device is not in communication with the OBCCN, wherein the OBCCN is operated independently from one or more Mobile Network Operators (MNOs) associated with the plurality of communication networks, wherein the offline map comprises respective geographic locations of the wireless electronic device associated with corresponding ones of the plurality communication networks, and wherein the offline map comprises associations with the plurality of communication networks that were previously used when the wireless electronic device was in corresponding ones of the geographic locations.

* * * * *